United States Patent
Nakabayashi

(10) Patent No.: US 6,678,918 B2
(45) Date of Patent: Jan. 20, 2004

(54) OPEN-CLOSE APPARATUS

(75) Inventor: Isao Nakabayashi, Kanagawa-ken (JP)

(73) Assignee: Piolax Inc., Kanagawa-ken (JP)

( * ) Notice: Subject to any disclaimer, the term of this patent is extended or adjusted under 35 U.S.C. 154(b) by 0 days.

(21) Appl. No.: 10/127,578

(22) Filed: Apr. 23, 2002

(65) Prior Publication Data

US 2002/0158383 A1 Oct. 31, 2002

(30) Foreign Application Priority Data

Apr. 25, 2001 (JP) ................................ P2001-126884

(51) Int. Cl.[7] .............. E05F 5/02; E05F 3/04; E05F 3/14; F16D 57/00
(52) U.S. Cl. ............... 16/82; 16/71; 16/51; 16/57; 188/290
(58) Field of Search ............... 16/82, 71, 51, 16/57, 63, 75; 188/290, 296, 293

(56) References Cited

U.S. PATENT DOCUMENTS

| | | | | |
|---|---|---|---|---|
| 4,527,675 A | * | 7/1985 | Omata et al. ............... 188/290 |
| 4,694,530 A | * | 9/1987 | Foggini ........................ 16/82 |
| 4,796,733 A | * | 1/1989 | Nakayama ................. 188/291 |
| 4,869,125 A | * | 9/1989 | Saigusa ....................... 74/574 |
| 4,893,522 A | * | 1/1990 | Arakawa ..................... 74/574 |
| 5,269,397 A | * | 12/1993 | Kawamoto et al. ......... 188/290 |
| 5,335,563 A | * | 8/1994 | Yamamoto et al. ........... 74/512 |
| 5,449,054 A | * | 9/1995 | Wiese et al. ................ 188/296 |
| 5,697,477 A | * | 12/1997 | Hiramoto et al. ...... 188/322.18 |
| 5,718,309 A | * | 2/1998 | Kariya ........................ 188/290 |
| 6,460,666 B1 | * | 10/2002 | Wach .................... 188/322.17 |

FOREIGN PATENT DOCUMENTS

| | | | |
|---|---|---|---|
| JP | 2594630 | 3/1999 | |
| WO | WO 8810377 A1 | * 12/1988 | ............. F16F/9/12 |

* cited by examiner

Primary Examiner—Anthony Knight
Assistant Examiner—Michael J. Kyle
(74) Attorney, Agent, or Firm—Greenblum & Bernstein, P.L.C.

(57) ABSTRACT

A sliding resistance member (3) is interposed between a glove box (B) and a rod type air damper (21). It is assumed that when a glove box lid (L) corresponding to a open-close member starts opening, the rod type air damper (21) rotates while running idle in conjunction therewith, in a relation in which the rotary type oil damper (3) is positively interposed between the glove box (B) corresponding to the mounting shaft and the rod type air damper (21). However, since a braking force of the sliding resistance member (3) is applied to the side of the open-close member in a rotating section of the rod type air damper (21), an sufficient damper effect can be obtained even when the open-close member starts opening.

10 Claims, 7 Drawing Sheets

OPEN-CLOSE APPARATUS

BACKGROUND OF THE INVENTION

1. Field of the Invention

The present invention relates to an open-close apparatus, which opens and closes the member such as a glove box lid of an automobile.

2. Description of the Related Art

In general, a glove box lid is connected to a rod type air damper provided in a glove box, so that an open-close speed of the glove box lid is controlled. However, in the case of mounting the rod type air damper on the glove box side, there is a case that such a layout that the rod type air damper is largely rotated around a mounting shaft is required on the basis of a relationship such as a peripheral space, as shown in Japanese Utility Model No. 2594630.

Under the layout mentioned above, when the glove box lid starts opening, the rod type air damper rotates around a mounting shaft of the rod type air damper in conjunction with the glove box lid. However, in this rotating section, an angle of legs astride between rods only becomes large, and the piston rods are not drawn out from an inner portion of a cylinder. Accordingly, when the glove box lid starts opening, it is impossible to obtain a sufficient damper effect.

SUMMARY OF THE INVENTION

The present invention was conceived to overcome this problem mentioned above, and an object of the present invention is to provide an open-close apparatus which can obtain a sufficient damper effect even when an open-close member starts opening.

The first aspect of the present invention provides an open-close apparatus comprising: a supporting member; an open-close member rotatably supported to the supporting member; a rod type damper to be conjunction with the supporting member rotatably and the open-close member; and a sliding resistance member interposed between the supporting member and the rod type damper, wherein an opening speed of the open-close member is controlled by the rod type damper and/or the sliding resistance member.

According to the first aspect, the sliding resistance member is positively interfering to the rotation of the rod type damper. Thus, when the open-close member starts opening, even if damper effect by the rod type damper does not generate, a braking force of the sliding resistance member is applied to the open-close member in the rotating section of the rod type damper. Accordingly, even when the open-close member starts opening, a sufficient damper effect can be obtained.

The second aspect of the present invention provides the open-close apparatus according to the first aspect of the present invention, wherein the mounting shaft is a boss portion provided in a side of the supporting member, wherein the sliding resistance member comprising: a tubular member constructed by an outer tube and an inner tube which rotate relatively; and a sliding resistance material interposed between the outer tube and the inner tube, wherein the tubular member has a through-hole that the boss portion is inserted in an inner portion of the tubular member, and wherein one of the outer tube and the inner tube is to be conjunction with the supporting member, the other thereof is to be conjunction with the rod type damper.

According to the second aspect, the sliding resistance member forms the tubular member constructed by the outer tube and the inner tube, and has the through-hole inserting the boss provided in the supporting member side in the inner portion of the tubular member. Accordingly, it is possible to easily assemble the sliding resistance member between the supporting member and the rod type damper. Further, the sliding resistance member is constructed by the outer tube and the inner tube which rotate relatively, and the sliding resistance material is interposed between the outer tube and the inner tube, whereby a secure damper effect can be expected.

The third aspect of the present invention provides the open-close apparatus according to the second aspect of the present invention, wherein the sliding resistance material is constructed by silicone oil.

The fourth aspect of the present invention provides an open-close apparatus comprising: a supporting member; an open-close member rotatably supported to the supporting member; a rod type damper to be conjunction with the supporting member rotatably and the open-close member; and a sliding resistance means for sliding both the supporting member and the rod type damper with suitable resistance interposed between the supporting member and the rod type damper, wherein an opening speed of the open-close member is controlled by the rod type damper and/or the sliding resistance means.

The fifth aspect of the present invention provides the open-close apparatus according to the fourth aspect, wherein the sliding resistance means utilize a viscous resistance.

The sixth aspect of the present invention provides an open-close apparatus comprising: a supporting member; an open-close member rotatably supported to the supporting member; a rod type damper to be conjunction with the supporting member by rotation with a mounting shaft center and the open-close member; and a sliding resistance member that interferes the rotation constructed between the supporting member and the rod type damper member, wherein an opening behavior of the open-close member is smooth by the rod type damper and/or the sliding resistance member.

Therefore, whole opening behavior of the open-close member is smooth.

The seventh aspect of the present invention provides the open-close apparatus according to the sixth aspect, wherein the sliding resistance member comprising: a tubular member constructed by an outer tube and an inner tube which rotate relatively; a sliding resistance material interposed between the outer and the inner tube; wherein one of the outer tube and the inner tube is to be conjunction with the supporting member, and other thereof is to be conjunction with the rod type damper.

The eighth aspect of the present invention provides the open-close apparatus according to the sixth aspect, wherein the outer tube is to be conjunction with the supporting member and the inner tube is to be conjunction with the rod type damper.

The ninth aspect of the present invention provides the open-close apparatus according to the sixth aspect, wherein the mounting shaft is boss portion integrally protruded in the supporting member.

The tenth aspect of the present invention provides the open-close apparatus according to the sixth aspect, wherein the mounting shaft is inserted into innerside of the sliding resistance member.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
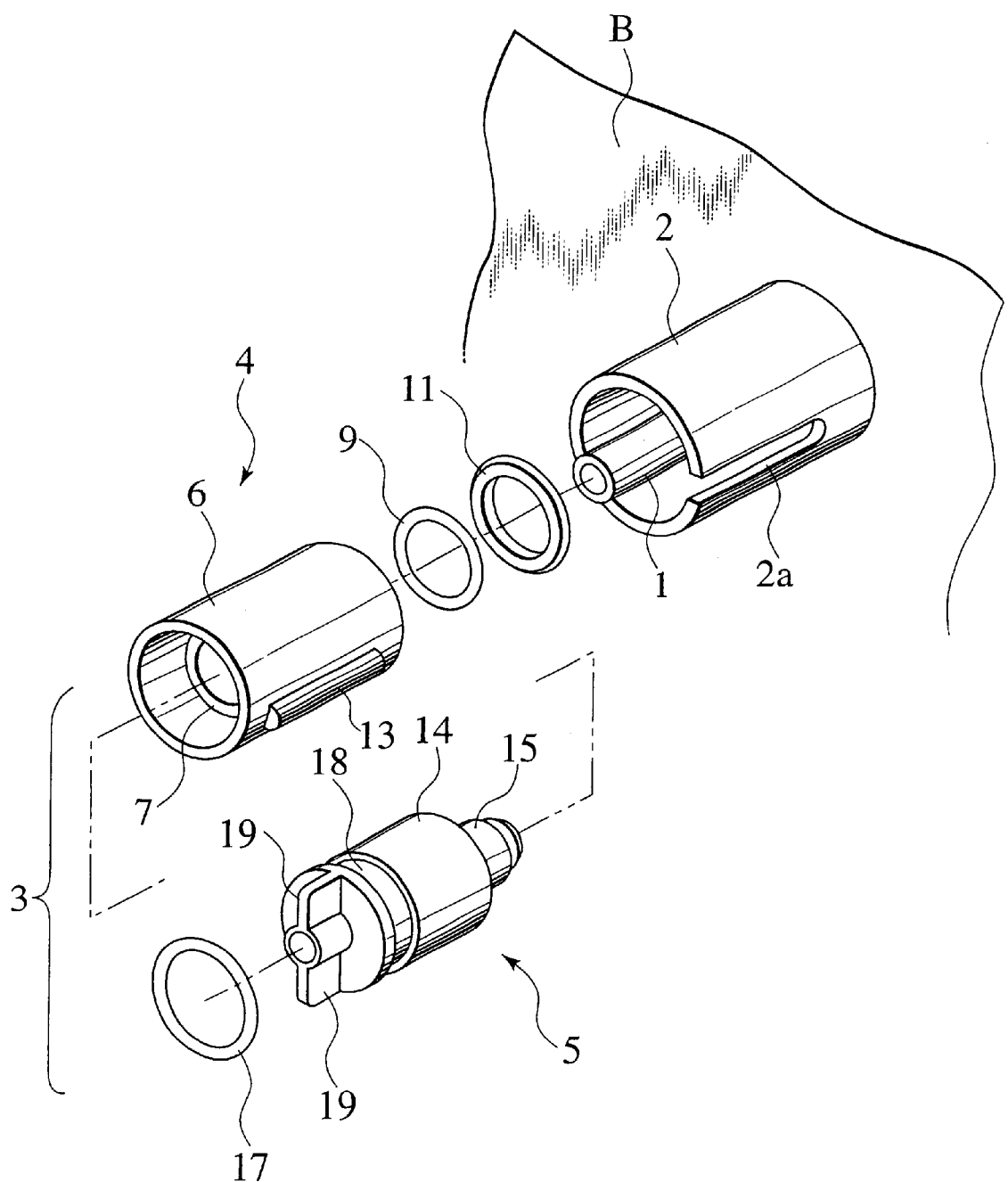
FIG. 1 shows an exploded perspective view showing a relation between a boss in a side of a glove box and a rotary type oil damper in an open-close apparatus according to the present invention.

According to an aspect of the present invention, an open-close apparatus includes a support and an open-close member rotatably supported by the support. The open-close apparatus also includes a rod type damper rotatably supported by the support. The rod type damper is rotatable in conjunction with the open-close member. The open-close apparatus further includes a sliding resistance member interposed between the support and the rod type damper. The rod type damper includes a first section, in which a braking force of the rod type damper is not generated, and a second section, in which the braking force of the rod type damper is generated. The sliding resistance member controls an opening speed of the open-close member by generating a rotational braking force and applying the rotational braking force to the first section of the rod type damper.

According to another aspect of the present invention, a mounting shaft includes a boss provided in a side of the support. The sliding resistance member includes a tubular member having an outer tube and an inner tube which rotate relatively to each other. The sliding resistance member also includes a sliding resistance material interposed between the outer tube and the inner tube. The tubular member has a through-hole into which the boss of the support extends. One of the outer tube and the inner tube is rotatable in conjunction with the support. The other of the outer tube and the inner tube is rotatable in conjunction with the first section of the rod type damper.

According to a further aspect of the present invention, the sliding resistance material is silicone oil.

According to an aspect of the present invention, an open-close apparatus includes a support and an open-close member rotatably supported by the support. The open-close apparatus also includes a rod type damper rotatably supported by the support. The rod type damper is rotatable in conjunction with the open-close member. The open-close apparatus also includes a sliding resistance damper that resists a rotation of the open-close member and the rod type damper. The sliding resistance damper is interposed between the support and the rod type damper. When the open-close member starts to open, a braking force of the sliding resistance damper is applied to the open-close member. The rod type damper controls an opening speed of the open-close member after the open-close member starts to open.

According to another aspect of the present invention, the sliding resistance damper utilizes a viscous resistance material.

According to yet another aspect of the present invention, a mounting shaft includes a boss provided in a side of the support. The sliding resistance member includes a tubular member having an outer tube and an inner tube which rotate relatively to each other. The inner tube has a through hole into which the boss of the support extends. The inner tube is rotatable in conjunction with the rod type damper. The outer tube is rotatable in conjunction with the support member. A sliding resistance material is interposed between the outer tube and the inner tube.

According to still another aspect of the present invention, the outer tube has a fitting projection. The support includes a fixing member having a slit into which the fitting projection extends. The fixing member protrudes from the support and extends concentrically with respect to the boss.

According to another aspect of the present invention, the inner tube has a fitting wing. The rod type damper has a fitting hole with which the fitting wing is engaged.

According to yet another aspect of the present invention, the rod type damper is mounted to the support by a screw being tightened into an inner portion of the boss that extends into the through hole of the inner tube.

Embodiments of the present invention will be explained below with reference to the drawings, wherein like numbers are designated by like reference characters.

An open-close apparatus according to an embodiment of the present invention aims at a glove box lid rotatably supported on a glove box of a motor vehicle. Further, it is on the assumption that an opening speed of the glove box lid is controlled by a rod type air damper rotatably provided in the glove box.

According to the present embodiment, as shown in FIG. 1, a boss 1 corresponding to a mounting shaft is integrally protruded in the glove box B corresponding to a supporting member. Further, the rod type air damper is mounted via rotary type oil damper 3. Further, a cylindrical fixing wall 2 having a slit 2a is also integrally protruded in a circumference on a concentric circle of the boss 1.

Figure 2:
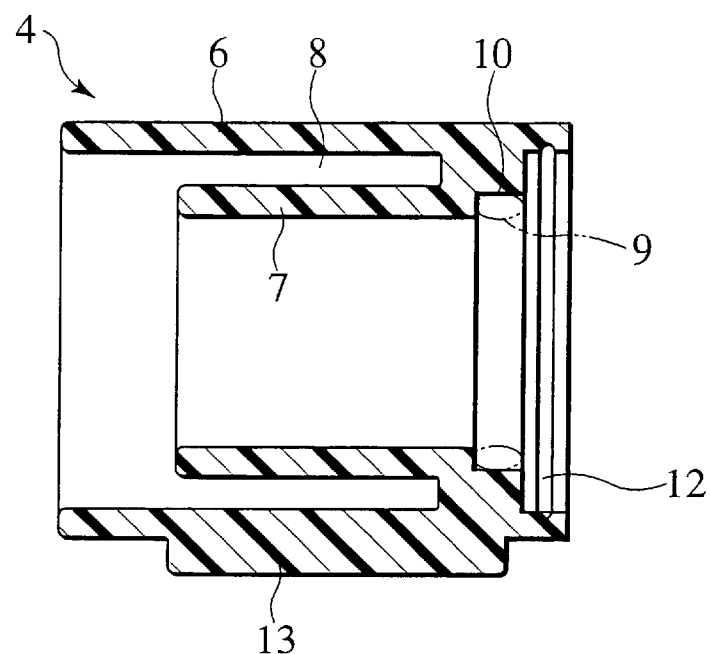
FIG. 2 shows a cross sectional view showing an outer tube of the rotary type oil damper.

As shown in FIG. 2, the rotary type oil damper 3 corresponding to a sliding resistance member mounted on the boss 1 forms a tubular member constructed by an outer tube 4 and an inner tube 5, which rotate relatively. The outer tube 4 forms a cylinder member of double structure comprised by an outer wall 6 and an inner wall 7. A cylindrical space 8 is formed between the outer wall 6 and the inner wall 7 so as to close one end portion of the cylindrical space 8. A ring groove 10 in which a first O-ring 9 is attached and a cap groove 12 in which an annular cap 11 is attached are formed in an inner side of the closed one end portion, and an fitting projection 13 fitted with the slit 2a of the fixing wall 2 is formed in an outer axial direction of the outer wall 6.

Figure 3:
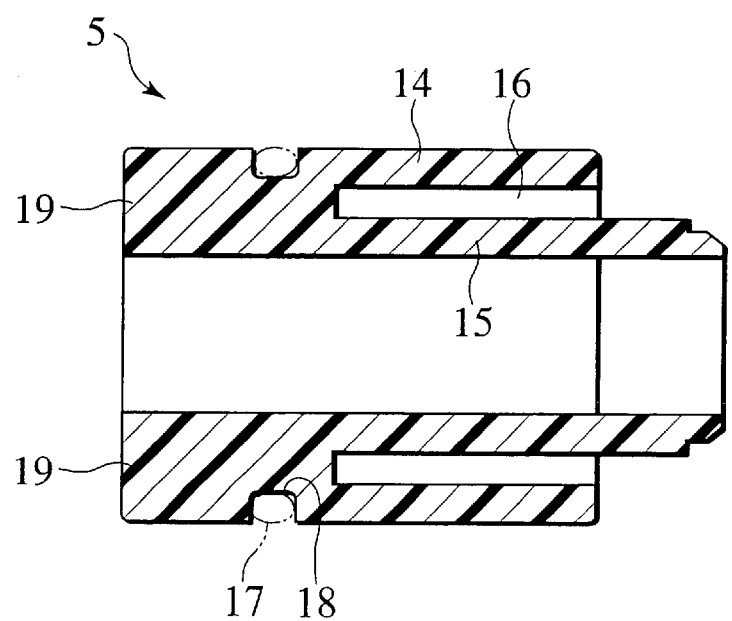
FIG. 3 shows a cross sectional view showing an inner tube of the rotary type oil damper.

As shown in FIG. 3, the inner tube 5 is one size smaller than the outer tube 4, and is formed as a cylinder member of double structure comprised by an outer wall 14 and an inner wall 15. A cylindrical space 16 is formed between the outer wall 14 and the inner wall 15 so as to close another end portion of the cylindrical space 16. Further, a ring groove 18 in which a second O-ring 17 is attached and a pair of fitting wings 19 engaged with a mounting piece 24 in a side of a rod type air damper 21 mentioned below are formed in an outer side of the closed another end portion.

Figure 4:
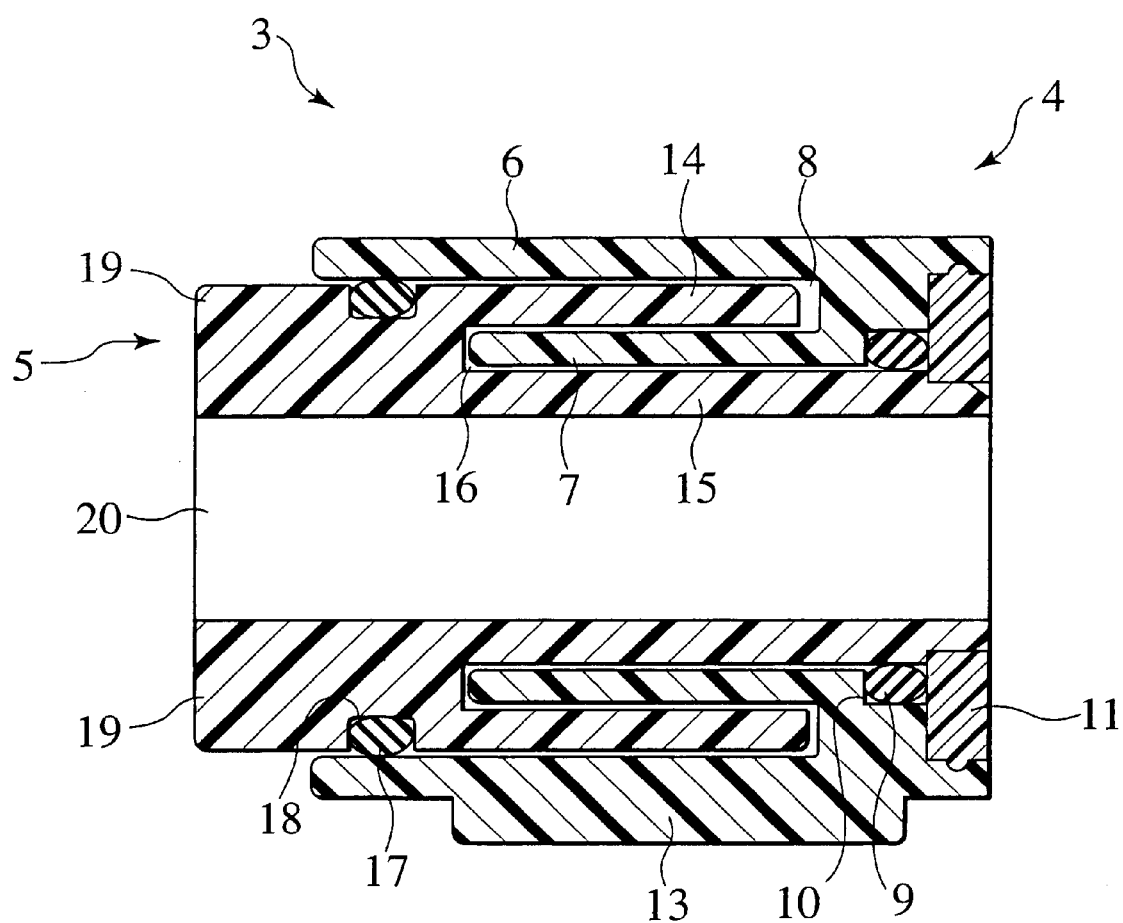
FIG. 4 shows a cross sectional view showing a state of assembled rotary type oil damper.

In the case of assembling the rotary type oil damper 3, the second O-ring 17 is attached in the ring groove 18 of the inner tube 5. A sliding resistance material (not shown) such as silicone oil or the like is charged within the tubular space 8 of the outer tube 4. The inner tube 5 is pressed within the outer tube 4 so that the outer wall 14 of the inner tube 5 is positioned within the tubular space 8 of the outer tube 4 and the inner wall 7 of the outer tube 4 is positioned within the tubular space 16 of the inner tube 5. The first O-ring 9 is attached in the ring groove 10 of the outer tube 4. The annular cap 11 is pressed within the cap groove 12 of the outer tube 4. As shown in FIG. 4, a front end portion of the inner wall 15 in the inner tube 5 is touched to inside wall of the annular cap 11. At the same time, there is obtained a state in which the sliding resistance material is charged into a gap between the inner wall 15 of the inner tube 5 and the inner wall 7 of the outer tube 4, a gap between the outer wall 14 of the inner tube 5 and the inner wall 7 of the outer tube 4 and a gap between the outer wall 14 of the inner tube 5 and the outer wall 6 of the outer tube 4. Accordingly, a through-hole 20 for inserting the boss 1 corresponding to the mounting shaft is formed in the inner wall 15 of the inner tube 5.

Figure 5:
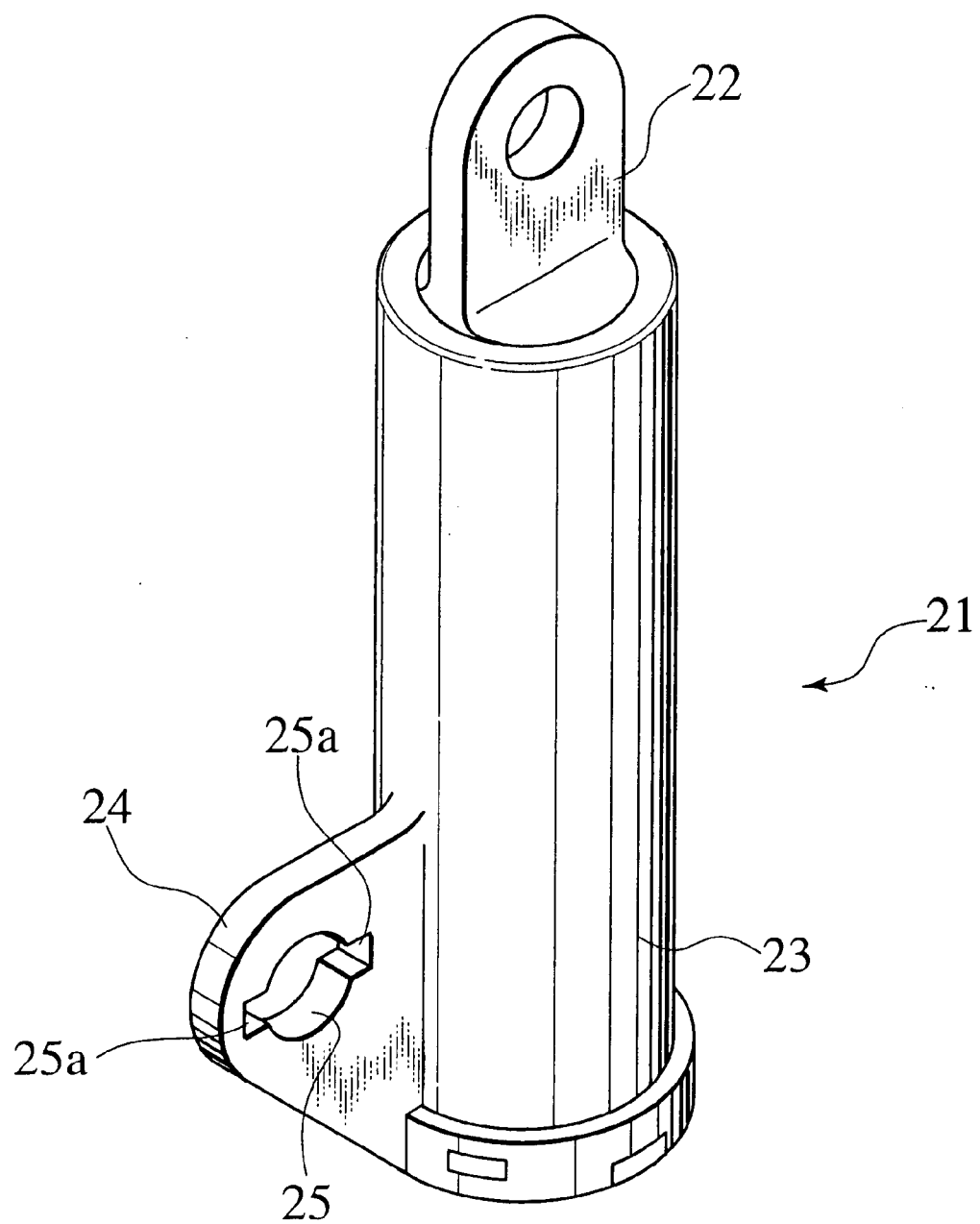
FIG. 5 shows a perspective view showing a structure in a side of the rod type air damper.

With respect to the rod type air damper 21, as shown in FIG. 5, a mounting piece 24 is provided on a cylinder 23 movably supporting the piston rod 22. An fitting hole 25 having a groove 25a preventing a free rotation of the inner tube 5 by inserting and fitting each of the fitting wings 19 of the inner tube 5 is formed in a center of the mounting piece 24.

As shown in FIG. 1, in order to interpose the rotary type oil damper 3 between the glove box B and the rod type air damper 21, the boss 1 is inserted into the through-hole 20 formed in the inner portion of the inner tube 5 while the fitting projection 13 of the outer tube 4 is fitting with the slit 2a of the fixing wall 2. The fitting projection 13 of the outer tube 4 is inserted into the slit 2a of the fixing wall 2, whereby the outer tube 4 of the rotary type oil damper 3 is easily fixed to the glove box B.

Figure 6:
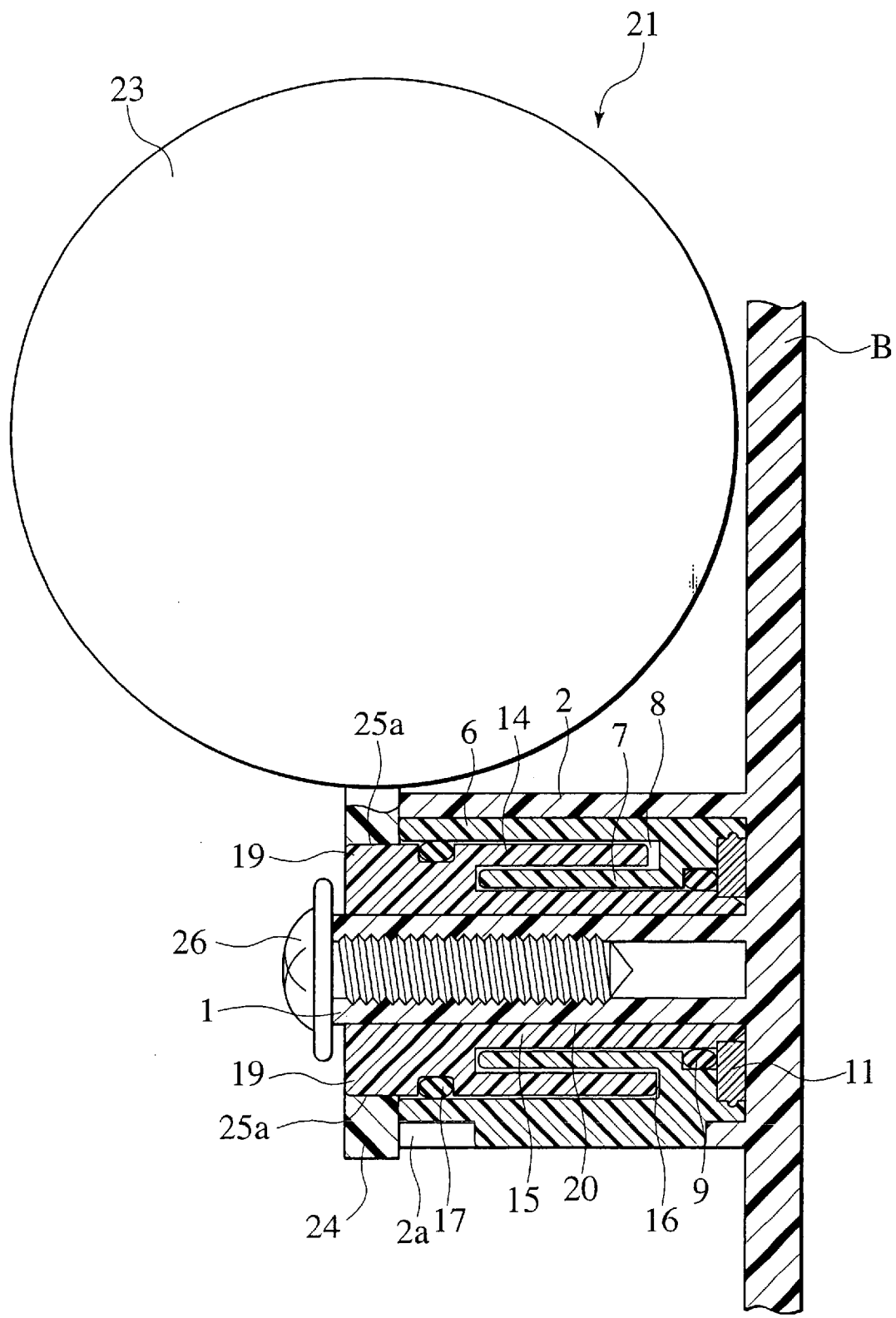
FIG. 6 shows a cross sectional view of a main portion showing a state of mounting the rod type air damper on the boss in the side of glove box via the rotary type oil damper.
Figure 7:
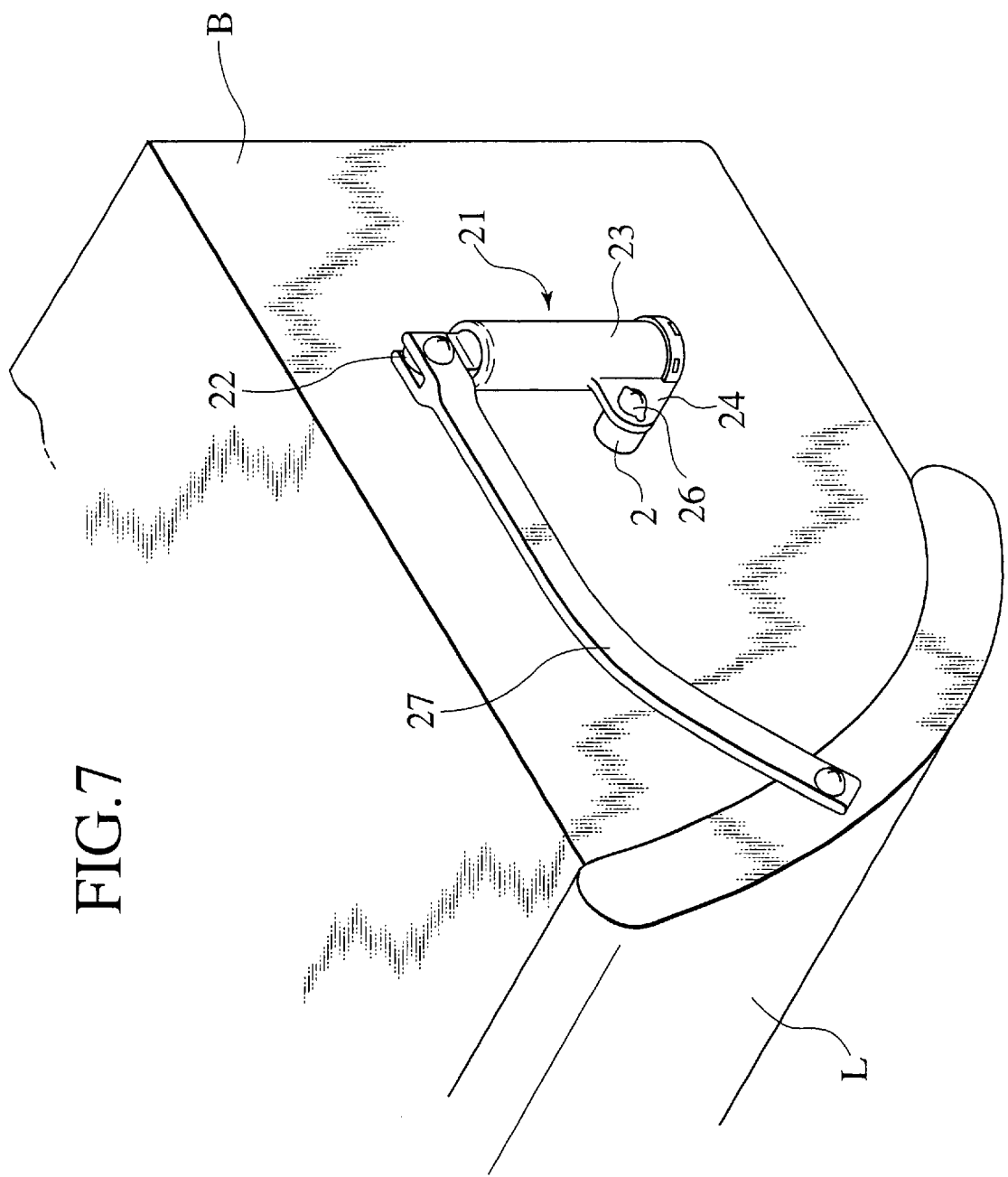
FIG. 7 shows a schematic view showing a closed state of a glove box lid with respect to the glove box.

A pair of fitting wings 19 of the inner tube 5 is inserted into the fitting hole 25 with the groove 25a formed in the mounting piece 24 of the rod type air damper 21. Then, a pair of fitting wings 19 are inserted into the groove 25a of the fitting hole 25, whereby the inner tube 5 of the rotary type oil damper 3 is to be conjunction with the rod type air damper 21. Thereafter, as shown in FIG. 6, a screw 26 is tightened into an inner portion of the boss 1 inserted with the through-hole 20 of the inner tube 5 from an outer side. Accordingly, the rod type air damper 21 is mounted to the glove box B via the rotary type oil damper 3 and the boss 1. Therefore, as shown in FIG. 7, when connecting the front end portion of the piston rod 22 in the rod type air damper 21 to a connection arm 27 provided in a glove box lid L corresponding to an open-close member, it is possible to control an opening speed of the glove box lid L by the rotary type oil damper 3.

In the case of opening the glove box lid L rotatably supported to the glove box B, it is assumed that when the glove box lid D starts opening, the rod type air damper 21 rotates while running idle in conjunction therewith, in a relation in which the rotary type oil damper 3 is positively interposed between the glove box B and the rod type air damper 21. However, in the rotating section of the rod type air damper 21, the inner tube 5 being conjunction with the rod type air damper 21 relatively rotates with respect to the outer tube 4 fixed to the glove box B exposing to the sliding resistance. Accordingly, the sliding resistance is applied to the side of the glove box lid L as a braking force. Therefore, even when the glove box lid L starts opening, a sufficient damper effect can be expected. The sliding resistance utilizes a viscous resistance from the sliding resistance material.

Figure 8:
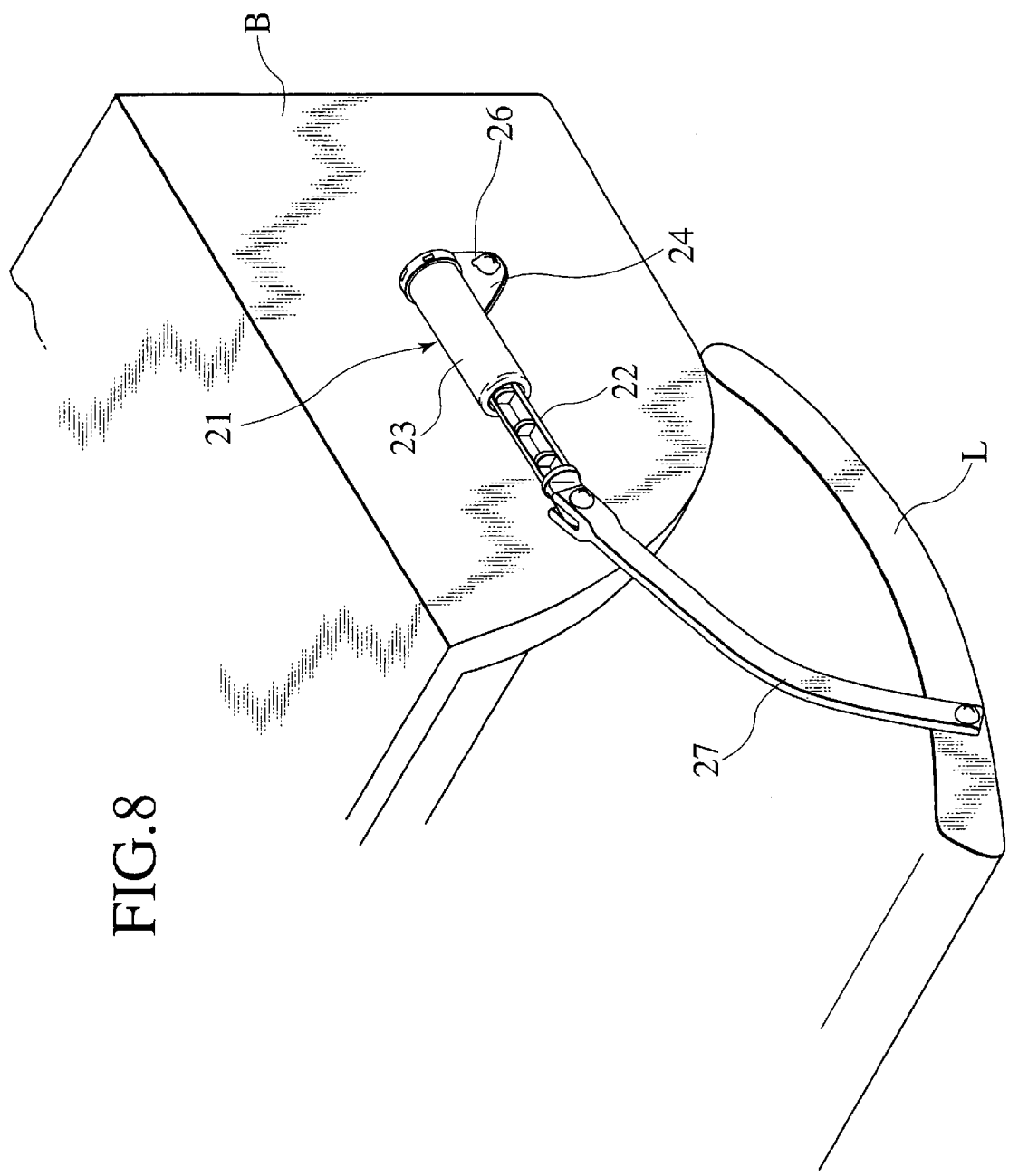
FIG. 8 shows a schematic view showing an open state of the glove box lid with respect to the glove box.

When passing through the rotating section of the rod type air damper 21, as shown in FIG. 8, the rod type air damper 21 is operated, so as to continuously control the opening speed of the glove box lid L At this time, rotary type oil damper 3 does not provide damper effect. Accordingly, the glove box lid L can obtain the continuous damper effect from an initial state of opening to a full open state. Damper effect always generate by either the rotary type oil damper 3 or the rod type air damper 21. Therefore, the glove box lid L is secured to open slowly whole section.

According to the embodiment mentioned above, the structure is made such that the outer tube 4 of the rotary type oil damper 3 is fixed to the glove box B, and the inner tube 5 is to be conjunction with the rod type air damper 21. However, the structure may be optionally made according to the execution such that the outer tube 4 is to be conjunction with the rod type air damper 21 and the inner tube 5 is fixed to glove box B.

What is claimed is:

1. An open-close apparatus comprising:
   a support;
   an open-close member rotatably supported by the support;
   a rod type damper rotatably supported by the support, the rod type damper being rotatable in conjunction with the open-close member; and
   a sliding resistance member interposed between the support and the rod type damper;
   wherein the rod type damper includes a first section, in which a braking force of the rod type damper is not generated, and a second section, in which the braking force of the rod type damper is generated, and
   wherein the sliding resistance member controls an opening speed of the open-close member by generating a rotational braking force and applying the rotational braking force to the first section of the rod type damper.

2. The open-close apparatus according to claim 1,
   wherein a mounting shaft comprises a boss provided in a side of the support;
   wherein the sliding resistance member comprises:
   a tubular member comprising an outer tube and an inner tube which rotate relatively to each other; and
   a sliding resistance material interposed between the outer tube and the inner tube,
   wherein the tubular member has a through-hole into which the boss of the support extends, and
   wherein one of the outer tube and the inner tube is rotatable in conjunction with the support and the other of the outer tube and the inner tube is rotatable in conjunction with the first section of the rod type damper.

3. The open-close apparatus according to claim 2,
   wherein the sliding resistance material comprises silicone oil.

4. An open-close apparatus comprising:
   a support;
   an open-close member rotatably supported by the support;
   a rod type damper rotatably supported by the support, the rod type damper being rotatable in conjunction with the open-close member; and
   a sliding resistance damper that resists a rotation of the open-close member and the rod type damper, the sliding resistance damper interposed between the support and the rod type damper,
   wherein when the open-close member starts to open, a braking force of the sliding resistance damper is applied to the open-close member, and wherein the rod type damper controls an opening speed of the open-close member after the open-close member starts to open.

5. The open-close apparatus according to claim 4, wherein the sliding resistance damper utilizes a viscous resistance material.

6. The open-close apparatus according to claim 1, wherein:

a mounting shaft comprises a boss provided in a side of the support, the sliding resistance member comprises a tubular member comprising an outer tube and an inner tube which rotate relatively to each other, the inner tube has a through hole into which the boss of the support extends, and the inner tube is rotatable in conjunction with the rod type damper, the outer tube is rotatable in conjunction with the support member, and a sliding resistance material is interposed between the outer tube and the inner tube.

7. The open-close apparatus according to claim 6, wherein:

the outer tube has a fitting projection, the support includes a fixing member having a slit into which the fitting projection extends, and the fixing member protrudes from the support and extends concentrically with respect to the boss.

8. The open-close apparatus according to claim 6, wherein:

the inner tube has a fining wing, and the rod type damper has a fitting hole with which the fitting wing is engaged.

9. The open-close apparatus according to claim 7, wherein:

the inner tube has a fitting wing, and the rod type damper has a fitting hole with which the fitting wing is engaged.

10. The open-close apparatus according to claim 6, the rod type damper being mounted to the support by tightening of a screw into an inner portion of the boss that extends into the through hole of the inner tube.

* * * * *

UNITED STATES PATENT AND TRADEMARK OFFICE
CERTIFICATE OF CORRECTION

PATENT NO. : 6,678,918 B2
DATED : January 20, 2004
INVENTOR(S) : I. Nakabayashi et al.

It is certified that error appears in the above-identified patent and that said Letters Patent is hereby corrected as shown below:

<u>Title page,</u>
Item [56], References Cited, OTHER PUBLICATION, was omitted and should be included:
-- English Language Abstract of JP-2594630. --

<u>Column 8,</u>
Line 9, "fining" should be -- fitting --.

Signed and Sealed this

Twentieth Day of July, 2004

JON W. DUDAS
*Acting Director of the United States Patent and Trademark Office*